(12) United States Patent
Hegna

(10) Patent No.: US 9,001,618 B2
(45) Date of Patent: Apr. 7, 2015

(54) METHOD OF ATTENUATING NOISE IN MARINE SEISMIC STREAMERS UTILIZING VARIED SENSOR SPACING AND POSITION-DEPENDENT BAND-PASS FILTERS

(75) Inventor: Stian Hegna, Hovik (NO)

(73) Assignee: PGS Geophysical AS, Oslo (NO)

( * ) Notice: Subject to any disclaimer, the term of this patent is extended or adjusted under 35 U.S.C. 154(b) by 1400 days.

(21) Appl. No.: 11/999,396

(22) Filed: Dec. 5, 2007

(65) Prior Publication Data

US 2009/0147621 A1 Jun. 11, 2009

(51) Int. Cl.
*G01V 1/38* (2006.01)
*G01V 1/36* (2006.01)

(52) U.S. Cl.
CPC .............. *G01V 1/3808* (2013.01); *G01V 1/364* (2013.01); *G01V 2210/21* (2013.01); *G01V 2210/324* (2013.01)

(58) Field of Classification Search
USPC .......................................... 367/15, 20, 21, 24
See application file for complete search history.

(56) References Cited

U.S. PATENT DOCUMENTS

| | | | |
|---|---|---|---|
| 1,799,398 A | 4/1931 | Taylor | |
| 4,692,909 A * | 9/1987 | Gard et al. .................. | 367/45 |
| 4,737,937 A | 4/1988 | Keckler et al. | |
| 4,821,241 A | 4/1989 | Berglund | |
| 5,251,183 A | 10/1993 | McConnell et al. | |
| 5,408,442 A | 4/1995 | Hepp | |
| 5,579,286 A | 11/1996 | Skorheim | |
| 6,446,009 B1 * | 9/2002 | Baeten et al. ................ | 367/45 |
| 6,684,160 B1 * | 1/2004 | Ozbek et al. ................. | 702/17 |
| 6,876,599 B1 * | 4/2005 | Combee ....................... | 367/21 |
| 7,003,402 B2 | 2/2006 | Christie et al. | |
| 7,386,397 B2 * | 6/2008 | Amundsen et al. ............ | 702/14 |
| 2008/0151689 A1 * | 6/2008 | Goujon .......................... | 367/24 |
| 2008/0186804 A1 * | 8/2008 | Amundsen et al. ............ | 367/24 |
| 2009/0122641 A1 * | 5/2009 | Hillesund et al. .............. | 367/20 |

FOREIGN PATENT DOCUMENTS

WO WO 2008/079636 7/2008

OTHER PUBLICATIONS

Mar. 11, 2009, United Kingdom Novelty Search Report.
J.O. Parr, Jr. et al., "A new method of pattern shooting", Geophysics, vol. 20, No. 3, Jul. 1955, p. 539-564.

(Continued)

*Primary Examiner* — Ian J Lobo

(57) ABSTRACT

The invention comprises a system for attenuating noise in seismic signals detected in a marine seismic streamer. In a particular implementation the system may comprise seismic detectors positioned in the streamer and interconnected to form a plurality of wavenumber filters, with each of the wavenumber filters attenuating signals within a range of wavenumbers. The output signals from the wavenumber filters are operatively connected to a plurality of band-pass filters, and the output signals of the band-pass filters are combined by summation means. The range of wavenumbers attenuated by the wavenumber filters and the passbands of the band-pass filters are selected so that in the output signal of the summation means, signals within a selected frequency range of interest propagating along the cable within a selected velocity range are attenuated and signals within the selected frequency range of interest having a velocity range outside the selected velocity range are preserved.

12 Claims, 2 Drawing Sheets

(56) References Cited

OTHER PUBLICATIONS

Carl H. Savit et al., "The moveout filter", Geophysics, vol. 23, No. 1, Jan. 1958, p. 1-25.
Mark Holzman, "Chebyshev optimized geophone arrays", Geophysics, vol. 28, No. 2, Apr. 1963, p. 145-155.
Peter Embree et al., "Wide-band, velocity filtering—The pie-slice process", vol. 28, No. 6, Dec. 1963, p. 948-974.
Michael Schoenberger, "Optimization and implementation of marine seismic arrays", Geophysics, vol. 35, No. 6, Dec. 1970, p. 1038-1053.
J.W. Bedenbender et al., "Electroacoustic characteristics of marine seismic streamers", Geophysics, vol. 35, No. 6, Dec. 1970, p. 1054-1072.
Michael Schoenberger et al., "Hydrophone streamer noise", Geophysics, vol. 39, No. 6, Dec. 1974, p. 781-793.
Milton B. Dobrin, "Introduction to Geophysical Prospecting", Third Edition, 1976, Chaper 4-4, p. 100-107.

\* cited by examiner

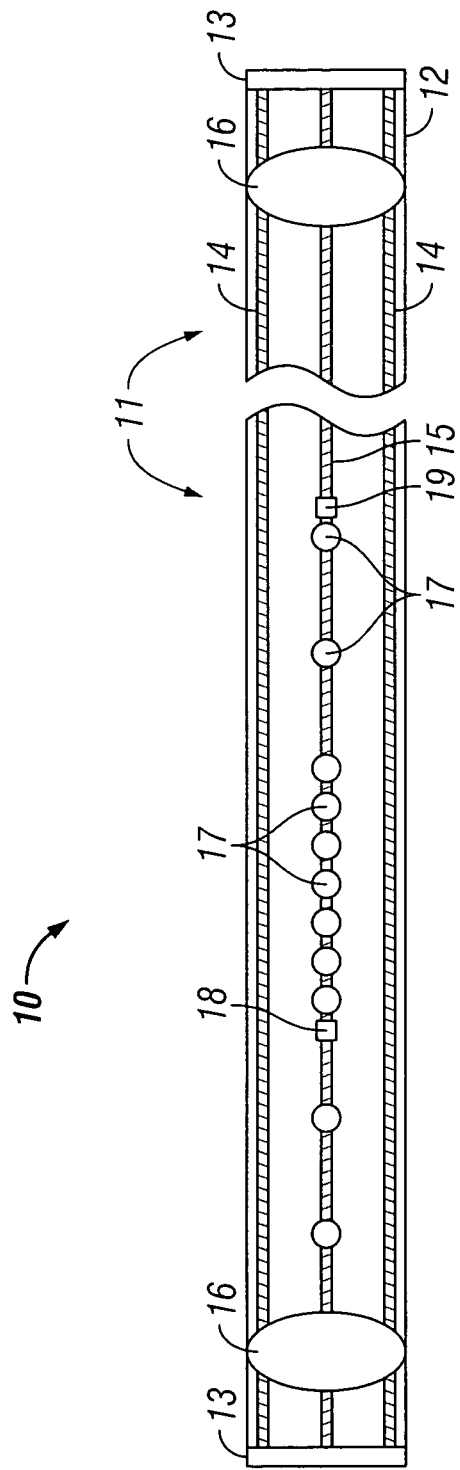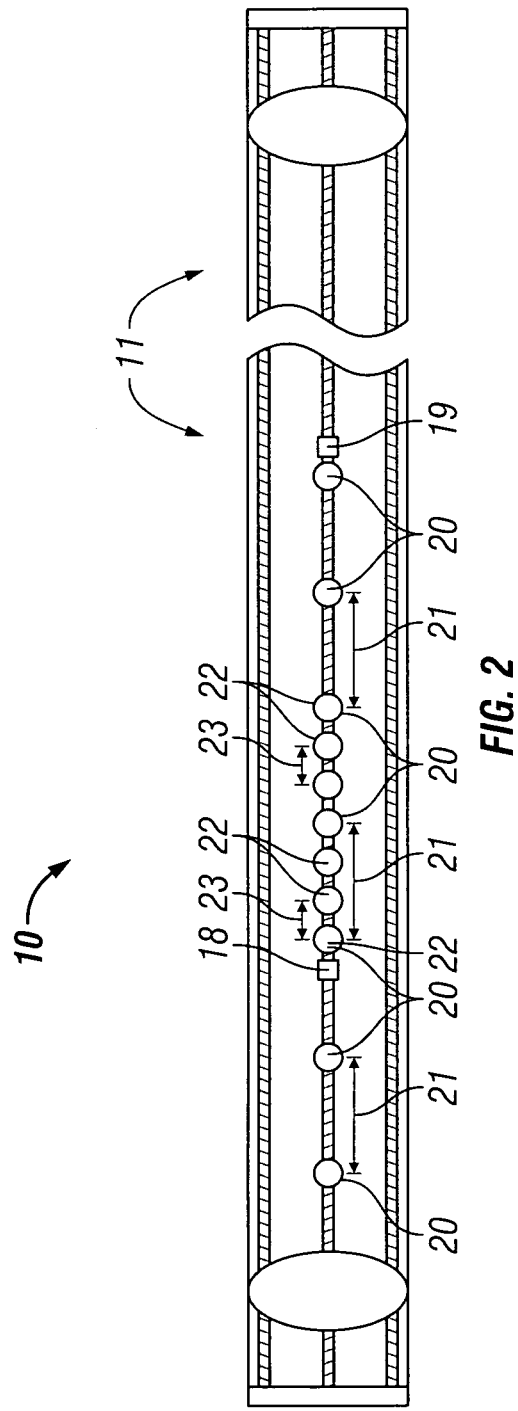

METHOD OF ATTENUATING NOISE IN MARINE SEISMIC STREAMERS UTILIZING VARIED SENSOR SPACING AND POSITION-DEPENDENT BAND-PASS FILTERS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting and particularly to the field of marine seismic surveys. More particularly, the invention relates to noise attenuation in marine seismic streamers.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downwardly into the subsurface of the earth. In a marine seismic survey, the seismic signal may also travel downwardly through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically wave velocity and rock density, which lead to differences in acoustic impedance at the interfaces. The reflections are detected by seismic sensors at or near the surface of the earth, in an overlying body of water, or at known depths in boreholes. The resulting seismic data is recorded and processed to yield information relating to the geologic structure and properties of the subterranean formations and their potential hydrocarbon content.

Appropriate energy sources may include explosives or vibrators on land and air guns or marine vibrators in water. Appropriate types of seismic sensors may include particle velocity sensors in land surveys and water pressure (typically pressure gradient) sensors in marine surveys. Particle acceleration sensors may be used instead of particle velocity sensors. Particle velocity sensors are commonly known in the art as geophones and water pressure sensors are commonly know in the art as hydrophones. Both seismic sources and seismic sensors may be deployed by themselves or, more commonly, in arrays.

In a typical marine seismic survey, a seismic survey vessel travels on the water surface, typically at about 5 knots, and contains seismic acquisition equipment, such as navigation control, seismic source control, seismic sensor control, and recording equipment. Seismic streamers cables are elongate cable-like structures towed in the body of water by the seismic survey vessel that tows the seismic source or by another seismic survey ship. Typically, a plurality of seismic streamers is towed behind a seismic vessel. The seismic streamers contain sensors to detect the wavefields reflected from reflecting interfaces. Conventionally, the seismic streamers contain pressure sensors such as hydrophones, but seismic streamers may also contain particle motion sensors such as geophones or accelerometers. The pressure sensors and particle velocity sensors may be deployed in close proximity, collocated in pairs or pairs of arrays along a seismic cable.

The sources and streamers are submerged in the water, with the seismic sources typically at a depth of 5-15 meters below the water surface and the seismic streamers typically at a depth of 5-40 meters.

The recorded seismic data signal contains useful primary reflections as well as much noise. The recorded noise may be coherent (that is, acts like a traveling wave) or random. Examples of coherent noise in land surveys include ground roll, guided waves, side-scattered noise, cable noise, air wave, power lines, and multiples. Multiples are especially strong relative to primaries in marine seismic surveys, because the water-earth and, particularly, the air-water interfaces are strong seismic reflectors due to their high acoustic impedance contrasts. Examples of random noise include noise resulting from poorly planted geophones and wind motion in land surveys, and noise resulting from transient movements in the seismic streamer cable, wave motion in the water causing the cable to vibrate, electrical noise from the recording instruments, and scattered noise from the many reflection surfaces in the subsurface in marine surveys.

Marine seismic streamers are typically divided into streamer sections approximately 100 meters in length, and can extend to a length of thousands of meters. A typical streamer section includes an external jacket, strength members, spacers, an electrical wire bundle, and connectors. The external jacket protects the interior of the streamer section from water ingress. The strength members, usually two or more, run down the length of each streamer section from end connector to connector, providing axial mechanical strength. The spacers maintain the cylindrical shape of the streamer section. The electrical wire bundle also runs down the length of each streamer section, and includes electrical power conductors and electrical and/or optical fiber communication conductors. Connectors at the ends of each streamer section link the section mechanically, electrically or optically to adjacent sections and, hence, ultimately to the seismic towing vessel.

Sensors, typically hydrophones or arrays of hydrophones, are located within the streamer. The hydrophones have sometimes been located within the spacers for protection. The distance between spacers is normally about 0.7 meters. An array of sensors, typically comprising 8 or 16 hydrophones, normally extends for a length of about 6.25 meters or 12.5 meters, respectively. These array lengths allow 16 or 8 arrays, respectively, in a standard 100 meter seismic section.

The interior of the seismic streamers is typically filled with a core material to provide buoyancy and desirable acoustic properties. For many years, most seismic streamers have been filled with a fluid core material. A drawback to using fluid-filled streamer sections is the noise generated by vibrations as the streamer is towed through the water. These vibrations develop internal pressure waves traveling through the fluid in the streamer sections, which are often referred to as "bulge waves" or "breathing waves".

In addition, there are other types of noise, often called flow noise, which can affect the hydrophone signal. For example, vibrations of the seismic streamer can cause extensional waves in the external jacket and resonance transients traveling down the strength members. A turbulent boundary layer created around the outer skin of the streamer by the act of towing the streamer can also cause pressure fluctuations in the fluid core material. The extensional waves, resonance transients, and turbulence-induced noise are typically much smaller in amplitude than the bulge waves. Even thermal variations within the streamer can bring about thermal stress in hydrophones employing piezoelectric materials, causing noise. Bulge waves are usually the largest source of vibration noise because these waves travel in the fluid core material filling the streamer sections and thus act directly on the hydrophones.

Several approaches have been employed to reduce the bulge noise problem in fluid filled steamer sections. For example, one approach is the use of stretch sections at the front and rear of the seismic streamer. Another approach is the application of low-cut filters. Another approach is to introduce compartment blocks in the sections to impede the vibration-caused bulge waves from traveling continuously along the streamer. Another approach is to introduce open cell foam into the interior cavity of the streamer section. The open cell foam restricts the flow of the fluid fill material in response to the transient pressure change and causes the energy to be dissipated into the external jacket and the foam over a shorter distance.

Another approach for eliminating bulge noise is to eliminate the fluid from the streamer sections, so that no medium exists in which bulge waves can develop. This approach is exemplified by the use of streamer sections filled with a solid core material or softer solid material instead of a fluid. However, in any solid type of material, some shear waves will develop, which can increase the noise detected by the hydrophones.

Another approach to address the noise problem is to combine several hydrophones into an array (also known as a group) to attenuate a slow moving wave. Traditional array forming for noise suppression in marine seismic streamers is based on a number of sensors (normally 8 to 16) connected together and effectively summed within the streamer sections before analogue to digital conversion.

However, there is a continuing need for methods for more effectively attenuating noise in marine seismic streamers.

BRIEF SUMMARY OF THE INVENTION

The invention comprises a system for attenuating noise in seismic signals detected in a marine seismic streamer. In a particular implementation the system may comprise seismic detectors positioned in the streamer and interconnected to form a plurality of wavenumber filters, with each of the wavenumber filters attenuating signals within a range of wavenumbers. The output signals from the wavenumber filters are operatively connected to a plurality of band-pass filters, and the output signals of the band-pass filters are combined by summation means. The range of wavenumbers attenuated by the wavenumber filters and the passbands of the band-pass filters are selected so that in the output signal of the summation means, signals within a selected frequency range of interest propagating along the cable within a selected velocity range are attenuated and signals within the selected frequency range of interest having a velocity range outside the selected velocity range are preserved.

BRIEF DESCRIPTION OF THE DRAWINGS

The invention and its advantages may be more easily understood by reference to the following detailed description and the attached drawings, in which:

FIG. 1 is a side elevation of a streamer section used to illustrate the system of the invention for attenuating noise in marine seismic streamers;

FIG. 2 is a side elevation of a streamer section illustrating the system of the invention for attenuating noise in marine seismic streamers.

Figure 3:
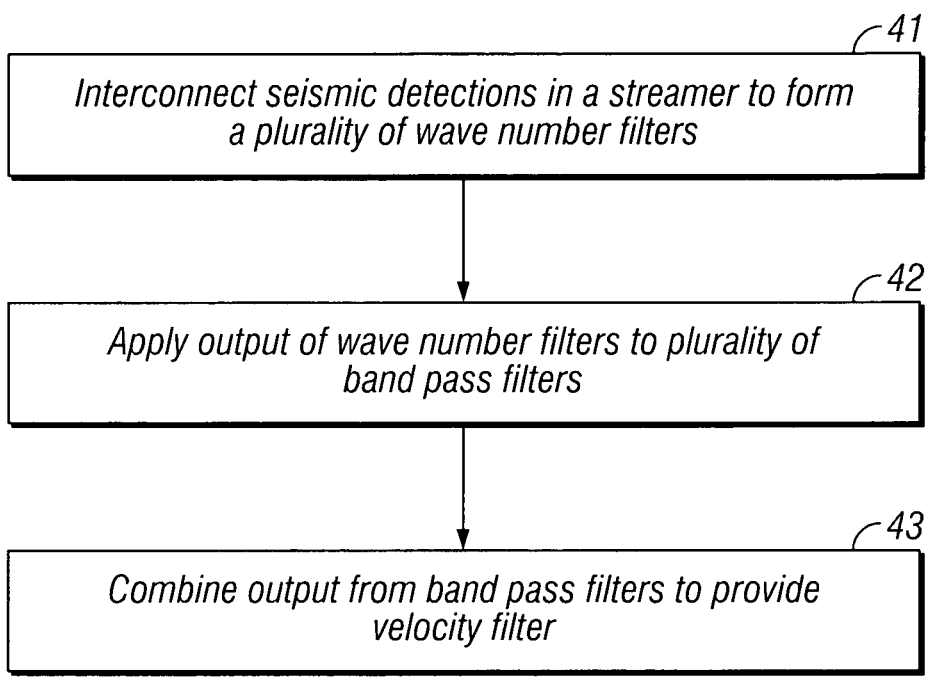
FIG. 3 is a flowchart illustrating the steps of an embodiment of the method of the invention for attenuating noise in marine seismic streamers.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

FIG. 1 shows a schematic side elevation of a streamer section which will be utilized to illustrate the system of the invention for attenuating noise in marine seismic streamers. A marine seismic survey system, generally indicated by the reference numeral 10, contains a streamer section 11. The streamer section 11 is contained within a marine seismic streamer (not shown) towed by a seismic survey vessel (not shown). The streamer section 11 includes an external jacket 12 with connectors 13 at each end. Several strength members 14 run down the length of the streamer section 11 from one end connector 13 to the other end connector 13. An electrical wire bundle 15 also runs down the length of the streamer section 11. Spacers 16 maintain the cylindrical shape of the streamer section 11.

Sensors 17 are positioned within and along the length of the streamer section 11. The sensors 17 are typically hydrophones and are arranged most commonly in arrays of sensors 17. Thus, the sensors 17 are typically arranged in horizontal, linear arrays in the streamer section 11 as it is being towed through the water.

Mechanical noise, such as bulge waves, propagating along marine seismic streamers typically has a much lower propagation velocity along the streamers compared to the apparent velocity of the seismic signal of interest. An acoustic signal propagating through water can not have a propagation velocity along the streamer any slower than propagation velocity of sound through water. Thus, the seismic signal will typically have a velocity on the order of 1500 m/sec (meters per second) and faster. Much of the mechanical noise propagating along the streamers, on the other hand, has a velocity on the order of 60 m/sec and slower, depending upon the tension applied through the strength members of the streamer. Such mechanical noise is not limited to a limited wavenumber range or a limited frequency range. Accordingly, a velocity filter will be more effective for attenuating mechanical noise propagating with a relatively slow velocity along a streamer than a wavenumber filter or a band-pass filter.

In a preferred embodiment of the invention, a filter substantially attenuates signals (such as streamer noise) within a selected seismic frequency range of interest that are traveling along a sensor array at a selected apparent velocity, and yet preserves signals (such as the seismic signal itself) in the seismic frequency range of interest that have a different apparent velocity.

In the invention, a plurality of wavenumber filters and band-pass filters are utilized. A wavenumber filter, as known to the prior art (in which the output signals of a plurality of sensors with equal spacing therebetween are combined), creates a notch in the amplitude spectrum of signals at a particular wavenumber. For signals traveling at a particular velocity, signals will be attenuated over a limited frequency range centered around a particular frequency (the notch frequency) by the wavenumber filter. Although frequencies in the vicinity of the notch frequency are also attenuated, only those frequencies within a limited frequency range around the notch frequency will be satisfactorily attenuated. By also applying a band-pass filter having a frequency passband centered around the notch frequency to the output signal of the wavenumber filter, all signals outside the limited frequency band in which signals are satisfactorily attenuated by the wavenumber filter are blocked. The output of this band-pass filter, then, is a signal within the particular frequency band from which signals traveling at the selected apparent velocity have been substantially attenuated and signals within this particular frequency band traveling at a different apparent velocity have not been attenuated.

By combing the output signals of multiple wavenumber filters followed by band-pass filters, a velocity filter is achieved in which signals within the seismic frequency range of interest at the selected apparent velocity are attenuated, while signals within the seismic frequency range of interest that are traveling at a different velocity are preserved. It will be understood that the combined passbands of the band-pass filters should cover the seismic frequency range of interest.

The filtering properties of conventional sensor arrays are well known in the art of geophysical prospecting. Consider a linear array of N sensors positioned along the x-axis with equal spacing $\Delta x$ between individual sensors and equal weighting applied to each sensor signal. The x-axis would typically be aligned with the in-line direction, or travel direction, of the seismic streamer. Then, for a generally sinusoidal wavefield arriving at the linear array, the array amplitude $A(k_x)$ measured by summing the sensors in the array will be a wavenumber spectrum, given by:

$$A(k_x) = \frac{1}{N}\left|\frac{\sin(N\pi k_x \Delta x)}{\sin(\pi k_x \Delta x)}\right|, \qquad (1)$$

where $k_x$ is the horizontal wavenumber along the x-axis. Equation (1) shows that the amplitude $A(k_x)$ is only dependent upon the wavenumber $k_x$, in addition to the number N of sensors and sensor spacing $\Delta x$. In particular, the amplitude $A(k_x)$ is not dependent upon the frequency f.

A notch in the wavenumber spectrum will occur where the numerator on the right hand side of Equation (1) goes to zero, that is, where $$\sin(N\pi k_x \Delta x)=0. \qquad (2)$$

Since the sine function goes to zero at multiples of $\pi$, the first notch in the wavenumber spectrum will occur where $$N\pi k_x \Delta x=\pi, \qquad (3)$$

that is, where the wavenumber $k_x$ is given by:

$$k_x = \frac{1}{N\Delta x}. \qquad (4)$$

Thus, Equations (1) through (4) show that the conventional practice of array forming through the use of multiple sensors located an equal distance apart and summed together produces a wavenumber filter. Wavenumbers around the value given by Equation (4) are in a notch and are thus attenuated.

As stated above, wavenumber filters, as provided by conventional array forming, can be combined with conventional frequency filters to provide a velocity filter. Velocity V, frequency f, and horizontal wavenumber $k_x$ are related through the following equation:

$$V = \frac{f}{k_x}. \qquad (5)$$

Here velocity V should be considered as an apparent velocity in the horizontal x-axis (inline) direction, since the wavefield will not necessarily impinge perpendicularly on the linear array. Equation (5) shows that a given velocity V is a function of both the frequency f and the wavenumber $k_x$. Thus, a velocity filter can be described as a frequency dependent wavenumber filter. This means that to construct a velocity filter to attenuate a given velocity V at a wavenumber $k_x$ given by Equation (4), a corresponding band-pass frequency filter centered around a frequency f given by:

$$f = Vk_x = \frac{V}{N\Delta x} \qquad (6)$$

is desired.

Equation (1) shows that the first notch in the wavenumber spectrum occurs when the wavenumber $k_x$ is equal to $1/(N\Delta x)$, since then $\sin(\pi)=0$ in the numerator. This reciprocal relationship between wavenumber $k_x$ and $N\Delta x$, the effective length of the array, shows that longer arrays filter smaller wavenumbers and, conversely, shorter arrays filter larger wavenumbers.

In order to filter the mechanical noise propagating with a slow velocity along the streamer, a long array of sensors, which will attenuate a range of shorter wavenumbers, can be matched with a low frequency band-pass filter, and increasingly shorter arrays of sensors, which filter increasingly larger wavenumbers, can be matched with increasingly higher frequency band-pass filters.

Band-pass filtering can be performed with analogue filters before analogue to digital conversion, or with digital filters after analogue to digital conversion. In an alternative embodiment, the sensors 17 themselves are selected to have a particular frequency response instead, to provide the band-pass filtering. However, by performing analogue filtering of the sensors before summation, or by using sensors with a particular frequency response, the number of analogue to digital converters required in the streamer sections can be reduced.

In one embodiment, band-pass frequency filters 18, 19 are positioned within the seismic survey system 10 The embodiment of the invention illustrated in FIGS. 1 and 2 uses analogue filters, indicated as band-pass filters 18, 19.

Each wavenumber filter—band-pass filter combination allows only a portion of the seismic bandwidth to pass through. Thus, employing a plurality of band-pass filters to substantially cover the entire seismic bandwidth being recorded is desired. Normally, there will be some overlap in the passbands of the band-pass filters. Preferably in the overlapping parts of the frequency ranges, the outputs of the band-pass filters will be tapered such that the combined output of the band-pass filters has a flat amplitude spectrum. Also, the phase response of each band-pass filter should be similar such that, after combining the output of the set of band-pass filters, the response is a continuous phase spectrum with no discontinuities between the passbands of the band-pass filters. This can be achieved by zero phase or linear phase filters.

FIGS. 1 and 2 show schematic side elevations of a streamer section which will be utilized to illustrate the system of the invention for attenuating noise in marine seismic streamers. Although FIGS. 1 and 2 show two combinations of sets of sensors (wavenumber filters) and corresponding band-pass filters, as will be explained below, this number is not a limitation of the invention, but merely for simplicity of illustration. The performance of the invention may be improved by utilizing combinations of wavenumber filters and band-pass filters.

FIG. 2 is a side elevation of a streamer section of FIG. 1, further illustrating the system of the invention for attenuating noise in marine seismic streamers. The sensors 17 in the streamer section 11 are positioned in arrays, in which sensors within an array are evenly spaced, and the sensor spacing in different arrays is different. A first set of sensors 20 is selected from the sensors 17 and positioned with a first spacing 21. The second set of sensors 22 is selected from the sensors 17 and positioned with a second spacing 23. Some of the sensors 17 are included in the first set of sensors 20 and the second set of sensors 22.

A first band-pass filter 18 is positioned within the seismic survey system 10, and is applied to signals detected by the first set of sensors 20. A second band-pass filter 19 is positioned within the seismic survey system 10, and is applied to signals detected by the second set of sensors 22. The first spacing 21 and the passband of the first band-pass filter 18, and the second spacing and the passband of the second band-pass filter 19 are determined so that the combination acts as a frequency dependent wavenumber filter, as described above, yielding a velocity filter for the velocity range of the noise source selected to be attenuated.

Band-pass filter 18 and 19 may be located in the streamer section 11 itself or anywhere else within the seismic survey system 10. By way of example but not of limitation, band-pass filter 18 and 19 could be in the form of a computer processor unit located elsewhere in the seismic streamer containing the streamer section 11 or located on the seismic survey vessel. The band-pass filters 18 and 19 may be composed of a single computer processing unit or a network of processing units within the seismic survey system 10. As mentioned above, the band-pass filters 18, 19 could also be incorporated into the sensors 17 themselves.

The outputs from band-pass filters 18, 19 are combined. Combining the outputs of band-pass filters 18, 19 yields the desired output signal covering the seismic frequency range of interest from which signals (energy) traveling at a selected velocity have been filtered.

The following example will illustrate an embodiment of the invention. Suppose that a velocity filter that attenuates noise with a velocity centered about 60 m/sec is desired. This velocity filter may be constructed from a combination of several pairs of wavenumber filters having appropriate sensor spacing and corresponding band-pass frequency filters. Summing the contributions from the combinations will provide a velocity filter centered about V=60 m/sec. In this simple example, five combinations of wavenumber filters and corresponding frequency filters will be illustrated. The wavenumber filters will be obtained by five sets of four (N=4) sensors with five different sensor spacings $\Delta x$. The corresponding five frequency filters will be band-pass filters centered around five corresponding frequencies f. Thus each combination of wavenumber filter and corresponding frequency filter corresponds to a combination of sensor spacing and corresponding band-pass filter, respectively.

A first combination of sensor spacing and band-pass filter starts with a sensor spacing of $\Delta x=1.5$ meters. According to Equation (6), the corresponding passband filter should center around the frequency f=10 Hz. This frequency filter could be, for example, the band-pass filter 0 Hz$\leq$f$\leq$20 Hz. A second combination of sensor spacing and band-pass filter can have a sensor spacing of $\Delta x=0.75$ meters. According to Equation (6), the corresponding passband filter would center around the frequency f=20 Hz. This frequency filter could be, for example, the band-pass filter 10 Hz$\leq$f$\leq$30 Hz.

Similarly, a third combination with sensor spacing $\Delta x=0.5$ meters can have a corresponding band-pass filter centered around the frequency f=30 Hz, such as, for example, the band-pass filter 20 Hz$\leq$f$\leq$40 Hz. A fourth and fifth combination could have sensor spacings of $\Delta x=0.3$ meters and $\Delta x=0.25$ meters, respectively. The corresponding band-pass filters would be centered around frequencies f=50 Hz and f=60 Hz, respectively. These filters, for example, could be the band-pass filters 40 Hz$\leq$f$\leq$60 Hz and 50 Hz$\leq$f$\leq$70 Hz, respectively. Additional combinations with band-pass filters that substantially cover the entire seismic bandwidth can be constructed and employed.

Each combination of sensor spacing and band-pass filter gives an approximation to the desired velocity filter. Summing the amplitudes of more and more of these sets of sensors, after being filtered by their corresponding band-pass filters, results in a better and better filter acting as a velocity filter centered around V=60 m/sec.

As stated above, in the overlapping parts of the frequency ranges it is preferable that the band-pass filters be tapered such that after combining the sets of band-pass filters the response is a flat amplitude spectrum, and that the phase response of each band-pass filter be similar such that after combining the sets of band-pass filters the response is a continuous phase spectrum with no discontinuities between the frequency bands.

FIG. 3 shows a flowchart illustrating the steps of an embodiment of a method of the invention for attenuating noise in a marine seismic streamer. In a particular embodiment, the invention is a method for providing a velocity filter, preferably for attenuating low velocity mechanical noise in the streamer. At step 41, seismic detectors are positioned in a seismic streamer and interconnected to form a plurality of wavenumber filters. At step 42, the output signals of the wavenumber filters are operatively applied to a plurality of band-pass filters. At step 43 the output signals from the band-pass filters are combined to generate a noise attenuated output signal. The range of wavenumbers attenuated by each of the wavenumber filter and the passbands of each of the band-pass filter are selected so that in the noise-attenuated output signal, signals within a selected frequency range of interest propagating along the cable within a selected velocity range are attenuated and signals within said selected frequency range of interest having a velocity outside said selected velocity range are preserved.

It should be understood that the preceding is merely a detailed description of specific embodiments of this invention

I claim:

1. A system for attenuating noise in seismic signals detected in a marine seismic streamer, comprising:
   one or more sets of sensor arrays in the streamer, sensors in each sensor array evenly spaced apart by a sensor spacing to form a wavenumber filter
   to attenuate the seismic signals within a range of wavenumbers;
   one or more band-pass filters, each of which is operatively applied to output signals of one of said wavenumber filters
   to generate one or more noise-attenuated output signals; and
   wherein the passbands of each said band-pass filter are selected in relation to the range of wavenumbers attenuated at a selected velocity range by the corresponding wavenumber filter to whose output signals the band-pass filter is applied, so that the noise-attenuated output signals within a selected frequency range of interest propagating along the cable within said selected velocity range are attenuated and signals within said selected frequency range of interest having a velocity range outside said selected velocity range are preserved.

2. The system of claim 1, wherein applying the band-pass filters comprises analog filtering.

3. The system of claim 1, wherein applying the band-pass filters comprises digital filtering.

4. The system of claim 1, wherein applying the band-pass filters is achieved through employing sensors with specific frequency responses.

5. A method for attenuating noise in seismic signals detected in a marine seismic streamer, comprising:
   detecting seismic signals at one or more sensor arrays in the streamer, sensors in each sensor array evenly spaced apart by a sensor spacing to form a wavenumber filter
   that attenuates the seismic signals within a range of wavenumbers;
   operatively applying the output signals of each of said wavenumber filters to one one or more band-pass filters
   to generate one or more noise-attenuated output signals; and
   wherein the range of wavenumbers attenuated by each said wavenumber filter and the passbands of each said band-pass filter are selected in relation to the range of wavenumbers attenuated at a selected velocity range by the corresponding wavenumber filter to whose output signals the band-pass filter is applied, so that in the noise-attenuated output signals within a selected frequency range of interest propagating along the cable within said selected velocity range are attenuated and signals within said selected frequency range of interest having a velocity range outside said selected velocity range are preserved.

6. The method of claim 5, wherein applying the band-pass filters comprises analogue filtering.

7. The method of claim 5, wherein applying the band-pass filters comprises digital filtering.

8. The method of claim 5, wherein applying the band-pass filters is achieved through employing sensors with specific frequency responses.

9. The system of claim 1, wherein the streamer includes one or more streamer sections, each streamer section having one or more sets of the sensor arrays.

10. The system of claim 9, wherein each of the one or more sets of sensor arrays within a streamer section have a different sensor spacing.

11. The method of claim 5, wherein the streamer includes one or more streamer sections, each streamer section having one or more sets of the sensor arrays.

12. The method of claim 11, wherein each of the one or more sets of sensor arrays within a streamer section have a different sensor spacing.

* * * * *